(12) United States Patent
Hähnel et al.

(10) Patent No.: US 11,118,633 B2
(45) Date of Patent: Sep. 14, 2021

(54) COUPLING RING

(71) Applicant: KWD KUPPLUNGSWERK DRESDEN GMBH, Dresden (DE)

(72) Inventors: Thomas Hähnel, Wilsdruff (DE); Thomas Klitzsch, Dresden (DE)

(73) Assignee: KWD KUPPLUNGSWERK DRESDEN GMBH, Dresden (DE)

( * ) Notice: Subject to any disclaimer, the term of this patent is extended or adjusted under 35 U.S.C. 154(b) by 454 days.

(21) Appl. No.: 15/780,928

(22) PCT Filed: Dec. 1, 2016

(86) PCT No.: PCT/EP2016/079372
§ 371 (c)(1),
(2) Date: Oct. 31, 2018

(87) PCT Pub. No.: WO2017/093372
PCT Pub. Date: Jun. 8, 2017

(65) Prior Publication Data
US 2019/0063506 A1  Feb. 28, 2019

(30) Foreign Application Priority Data
Dec. 4, 2015  (DE) ...................... 20 2015 008 453.2

(51) Int. Cl.
*F16D 3/64* (2006.01)
*F16D 3/68* (2006.01)
*F16D 3/78* (2006.01)

(52) U.S. Cl.
CPC ................ *F16D 3/64* (2013.01); *F16D 3/68* (2013.01); *F16D 3/78* (2013.01)

(58) Field of Classification Search
CPC ................ F16D 3/64; F16D 3/68; F16D 3/78
(Continued)

(56) References Cited

U.S. PATENT DOCUMENTS 6,358,154 B1  3/2002  Murrell et al.
8,393,973 B2 *  3/2013  Kirschey ................... F16D 3/68
(Continued)

FOREIGN PATENT DOCUMENTS

EP  0 937 902  8/1999
EP  2 325 510  5/2011
(Continued)

*Primary Examiner* — Greg Binda
(74) *Attorney, Agent, or Firm* — Greenblum & Bernstein, P.L.C.

(57) ABSTRACT

A coupling ring for couplings having at least two coupling parts. The object of the invention is to provide a coupling ring for couplings which have at least two coupling parts, which can be applied to the two coupling parts of the coupling in a simpler and easier manner during installation, in particular in the event of a repair for defects in the coupling ring designed as a wedge packet ring and in the coupling region of the wedge packet ring. The aim is achieved by a coupling ring as a wedge packet ring comprising at least two coupling parts, wherein the wedge packet ring is divided into at least two one-piece ring segments from an alternate arrangement of the securing elements and the spring elements, wherein the one-piece ring segments are fitted with apportioned closure securing elements which are located at the respective end regions on a ring segment and are provided to form a closure, wherein the apportioned closure securing elements connecting the ring elements each have wedge parts which are each adapted to each other and have bores that are radially directed towards the ring axis, wherein the correspondingly adapted wedge parts can each be combined together to form a radial screw connection on one of the two coupling parts.

16 Claims, 9 Drawing Sheets

(58) Field of Classification Search
USPC .................................................... 464/81, 85
See application file for complete search history.

(56) References Cited

U.S. PATENT DOCUMENTS

2012/0058831 A1    3/2012   Kirschey
2014/0231210 A1    8/2014   Spensberger

FOREIGN PATENT DOCUMENTS

GB           377 454      7/1932
WO      2013/041082      3/2013

\* cited by examiner

Prior Art

A coupling ring for couplings having at least two coupling parts.

COUPLING RING

BACKGROUND

(1) Field of the Invention

The invention relates to a coupling ring for couplings having at least two coupling parts.

(2) Description of the Background

Figure 1:
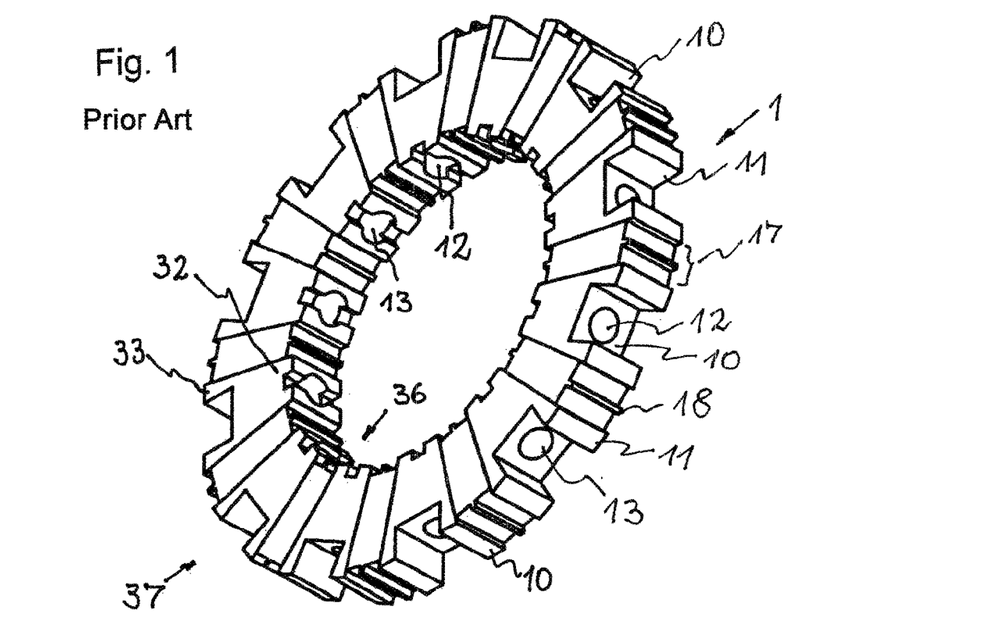
FIG. 1 shows a schematic perspective illustration of a one-piece coupling ring in the form of a wedge packet ring without coupling parts, according to the prior art.
Figure 2:
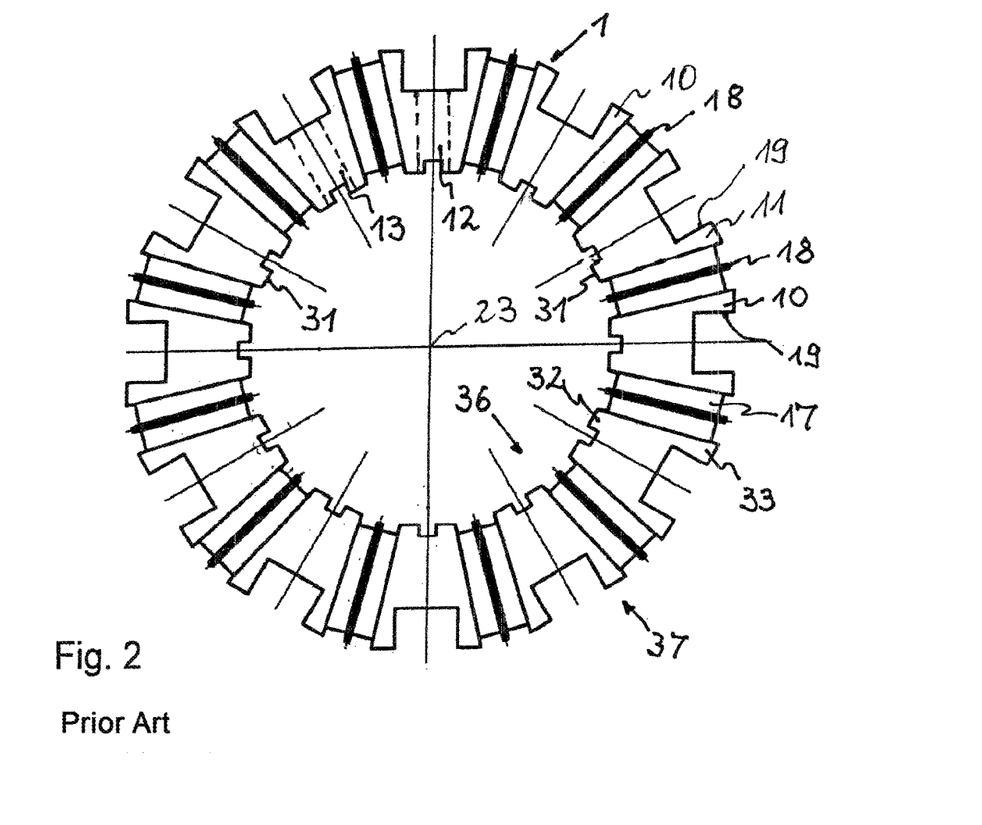
FIG. 2 shows a sectional illustration of the wedge packet ring according to FIG. 1.
Figure 3:
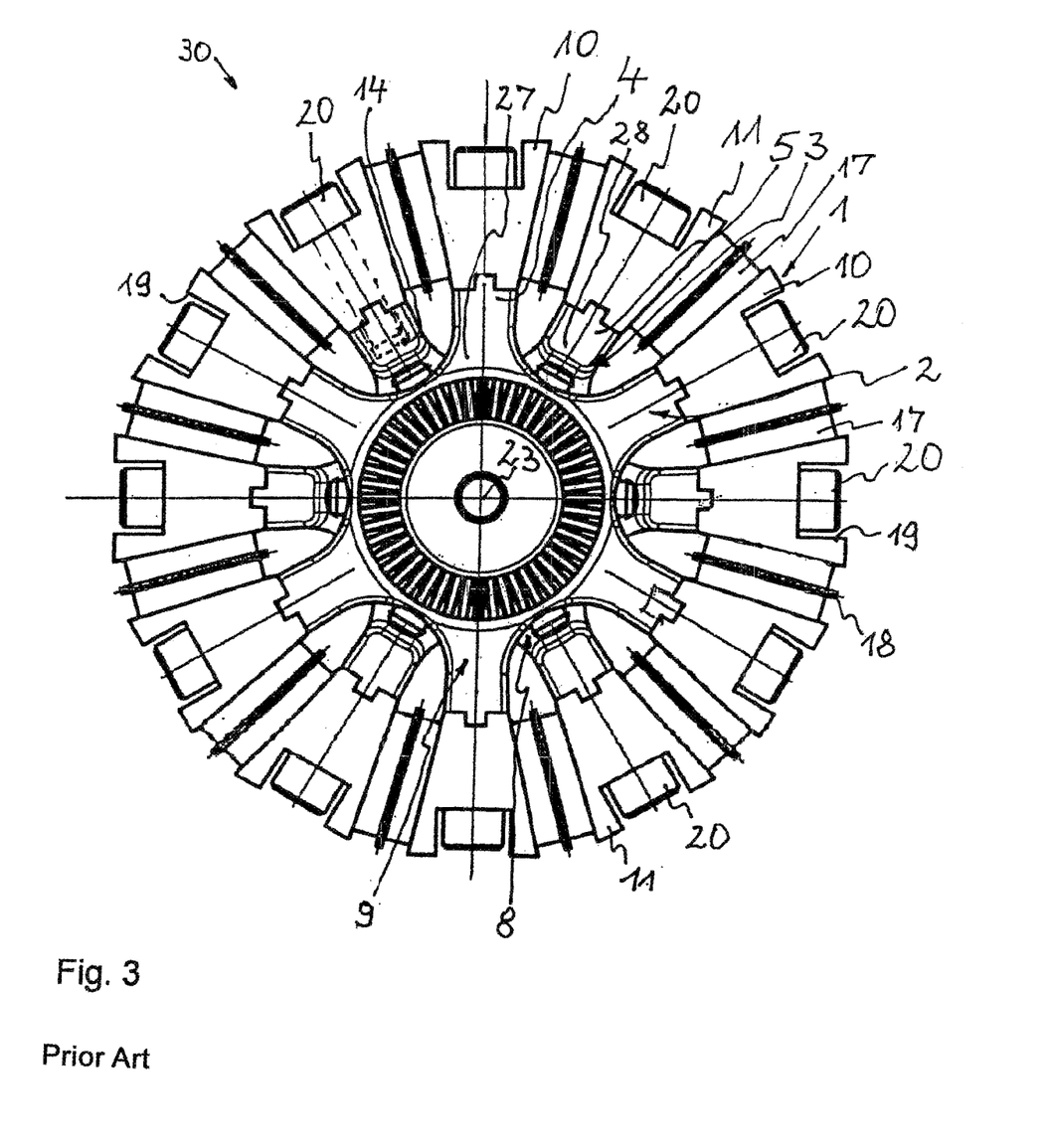
FIG. 3 shows an illustration in an axial view of a conventional coupling having a wedge packet ring with solely radially directed screw connections at the star arm face regions of the two stars of the related coupling parts of the coupling according to the prior art.

In the publication WO 2013/041082 A1, a coupling ring in the form of a wedge packet ring for couplings having two coupling parts is described, which ring is schematically illustrated in FIG. 1, FIG. 2, and FIG. 3, wherein FIG. 1 shows a perspective illustration of the conventional wedge packet ring 1, which is embodied as a unitary and, at least within securing elements 10, 11, undivided and unsegmented one-piece ring, as is also shown in FIG. 2, which ring is in its entirety mounted under prestress on the two coupling parts 8, 9 illustrated in FIG. 3.

The wedge packet ring 1 comprises multiple identically designed securing elements 10, 11 that are directed towards the ring axis 23 of the wedge packet ring 1 and arranged around the ring circumference, of which elements each has a bore 12, 13 that is directed solely towards the ring axis 23, is continuous, and is shown in FIG. 2, wherein the continuous bores 12, 13 are used, for at least one screw connection 20 shown in FIG. 3 that is solely radially directed and can be implemented from the outer ring region 37, to attach the securing elements 10, 11 onto the two adapted coupling parts 8, 9 illustrated in FIG. 3 in order to connect the two coupling parts 8, 9, wherein

- the securing elements 10, 11 of the wedge packet ring 1 each comprise at the inner ring region 36 shown in FIG. 2 a profile 31 directed towards the ring axis 23,
- between the securing elements 10, 11 that are adjacent around the ring circumference one elastic spring element 17 each is provided which is attached in a vulcanized manner to the adjacent securing elements 10, 11 in a simultaneously conducted vulcanization process,
- as a result of which an arrangement, alternating around the ring circumference, of the securing elements 10, 11 and the elastic spring elements 17 constitutes the wedge packet ring 1, which is screwed radially as a one-piece ring onto the two adapted coupling parts 8, 9 in order to connect the two coupling parts 8, 9.

In FIG. 2, a sectional illustration of the conventional one-piece wedge packet ring 1 according to FIG. 1 is shown.

FIG. 3 shows a schematic illustration of a coupling 30 having the two coupling parts 8, 9 with the one-piece wedge packet ring 1 according to FIG. 1 and FIG. 2 attached thereto.

In the coupling 30 with the one-piece wedge packet ring 1 on the two coupling parts 8, 9—one drive-side coupling part 8 and one output-side coupling part 9—the coupling parts 8, 9 each comprise in FIG. 3 a star 2, 3 with star arms 27, 28 and star arm face regions 4, 5 located thereon, wherein the two stars 2, 3 are arranged in the coupling 30 such that they oppose one another and are axially angularly offset from one another, and the star arm face regions 4, 5 axially offset from the respective star center are each provided with at least one threaded bore 14 for screw connections 20 of the wedge packet ring 1.

The securing elements 10, 11 can be composed of solid material and, in particular, can be embodied metallically.

The securing elements 10, 11 can be provided with different geometric body shapes, and the elastic spring elements 17 can also be embodied with different geometric shapes adapted to the shapes of the securing elements 10, 11.

The securing elements 10, 11 can, at least on two opposing sides, be tapered and/or profiled in cross-section in the direction from the outside of the ring to the inside of the ring.

The securing elements 10, 11 can, in the direction from the outer ring edge region 37 to the ring axis 23, be formed in a wedge shape, wherein according to FIG. 1 and FIG. 2 the wedge-shaped narrow end region 32 is at the inside of the ring and the wedge-shaped wide end region 33 is at the outside of the ring.

The securing elements 10, 11 can preferably comprise at the wedge-shaped wide end region 33 thereof outer recesses/slots/depressions 19, each in the form of either a countersunk groove or a countersunk hole, for the radially directed screw connections 20.

The spring elements 1 can be composed of elastic material.

The elastic spring elements 17 can, as shown in FIG. 1 through FIG. 3, comprise at least one support plate 18 directed towards the ring axis 23.

However, the elastic spring elements 17 can also contain at least one support plate each in a topographic embodiment, for example, each embedded between two spring elements, with a raised surface and not solely directed towards the ring axis 23.

The support plates 18 can be embodied in a wedge shape directed towards the ring axis 23.

The spring elements 17 or portions thereof can be embodied with at least one concave midsection directed radially and/or axially towards the ring axis 23.

The disadvantage of the conventional, integrated, and one-piece wedge packet ring 1 is that, for a repair in the event of a defect, at least one of the securing elements 10, 11 or the spring elements 17 or in the case of a defect in the contact between the securing elements 10, 11 and the spring elements 17, a time-intensive disassembly of the undivided and unsegmented wedge packet ring 1 and subsequently an equally laborious assembly thereof on the two coupling parts 8, 9 are necessary.

SUMMARY

Therefore, the object of the invention is to specify a coupling ring for couplings having at least two coupling parts, which ring is suitably embodied so that, particularly in the case of a repair for defects on the coupling ring embodied as a wedge packet ring and in the coupling region thereof, the wedge packet ring can be attached onto the two coupling parts of the coupling in a simpler and easier manner during assembly.

This object is attained with the features of the claimed invention.

The coupling ring for couplings having at least two coupling parts, wherein the coupling ring is embodied as a wedge packet ring, comprises at least several securing elements arranged around the ring circumference that are directed towards the ring axis of the wedge packet ring and each have at least one continuous bore directed solely radially towards the ring axis, wherein the continuous bores are used, for at least one screw connection that is solely radially directed and can be implemented from the outer ring region, to attach the securing elements onto the two adapted coupling parts arranged in an angularly offset manner, in order to connect the two coupling parts, wherein the securing elements each comprise at the inner ring region an axially running profile directed towards the ring axis, between the adjacent securing elements one elastic spring element each is present which is attached in a vulcanized manner to the adjacent securing elements in a simultaneously conducted vulcanization process, as a result of which an alternating arrangement of the securing elements and the elastic spring elements constitutes a wedge packet ring, which can be screwed radially onto the two adapted coupling parts in order to connect the two coupling parts, wherein according to the characterizing part of patent claim 1, the wedge packet ring is divided into at least two one-piece ring segments composed of an alternating arrangement of the securing elements and the spring elements, wherein the one-piece ring segments are fitted with apportioned closure securing elements which are respectively located at the end regions on a ring segment and are provided to form a closure, wherein the apportioned closure securing elements connecting the ring segments respectively comprise wedge parts that are adapted to one another and have bores directed radially towards the ring axis, wherein the correspondingly adapted wedge parts can each be joined together for a radial screw connection onto one of the two coupling parts.

The closure securing elements are elements which result from the division or segmentation of the wedge packet ring in place of the original undivided securing elements.

A closure then arises at the respective end regions of the ring segments when a defined contact surface of the outer wedge part and a corresponding contact surface of the inner wedge part are in firm contact with one another. Depending on the position of the contact surfaces, this can then be a positive fit or a frictional fit, or both fits in combination.

A wedge packet ring divided into at least two one-piece ring segments can be provided with an inner wedge part and with an outer edge part on one end region each of each related ring segment, wherein if two ring segments are present, a first ring segment can be embodied with an outer wedge part on one end region thereof and an inner wedge part on the other end region thereof, and a second ring segment can be embodied with an outer wedge part on one end region thereof and an inner wedge part on the other end region thereof, wherein the inner wedge part of the one ring segment and the outer wedge part of the other ring segment each oppose one other before the ring is closed and are in contact with one another via a closure when the ring is closed.

All securing elements can be screwed onto star arm face regions of the stars of the coupling parts by means of the radially directed screw connections, and the two ring segments can also be screwed under prestress onto the star arm face regions of the stars of the coupling parts by means of the radially directed screw connections via the apportioned closure securing elements.

A closure securing element can, for example, be composed of an in longitudinal section pick-hammer-like outer wedge part and of an in longitudinal section chair-like inner wedge part, with both parts adapted to one another, each of which is in direct contact with the contact surfaces thereof located on the inner wedge parts and the contact surfaces thereof located on the outer wedge parts when the closure is formed during the closing of the wedge packet ring.

The for example in longitudinal section chair-like inner wedge part can be modified by means of an attached head closure part, and the head closure part can also bear against the in longitudinal section pick-hammer-like outer wedge part when the closure is formed.

A ring segment can be embodied with halved closure part securing elements at the end regions of the ring segment, at least with a first notch within the depression of the halved closure part securing element and at least with a second notch within the depression of the other halved closure part securing element, wherein the two ring segments can be joined together to form a ring when the halved closure part securing elements that correspond to one another are each in contact with one another in an opposing manner or are guided via the screw connection and thus each form a closed closure securing element, and wherein in the notches of the depressions, which notches are spaced apart from one another, clip-like or bridge-like insertion elements are integrated to retain the halved closure part securing elements.

The two closure part securing element halves can, with the opposing notches, comprise between the two element halves an annular gap for accommodating a sheet metal ring.

The insertion elements for two paired notches in the closure securing elements can be embodied as clips or bridges with identically parallel-aligned tabs at the ends, and with the tabs thereof at the ends can be inserted or plugged into the notches adapted to the tabs, to fix and lock the two closure part securing element halves for the formation of the closure securing elements.

All securing elements can be composed of solid material and, in particular, can be embodied metallically.

The shapes of the securing elements can be adapted to the shapes of the spring element, so that the vulcanization of the spring elements onto the securing elements takes place with the same quality for both the ring segments and also for the entire wedge packet ring.

All securing elements can be formed with a wedge shape towards the ring axis, wherein the wedge-shaped narrow end region is at the inside of the ring and the wedge-shaped wide end region is at the outside of the ring.

All securing elements can preferably comprise at the wedge-shaped wide end region thereof outer recesses/slots/depressions, each in the form of either a countersunk groove or a countersunk hole, for the radially directed screw connections.

The spring elements can be composed of elastic material.

The center bore of an apportioned securing element can be provided with a sleeve, through which the screw of the screw connection is guided and which serves as a retaining sleeve for the two parts of the apportioned securing element.

A shoulder screw can also be guided through the center bore of an apportioned securing element.

The elastic spring elements can comprise at least one support plate directed towards the ring axis.

The radially directed support plates can be arranged in the center of the spring elements. The support plates can be embodied not only with parallel, flat surfaces, but rather also in a wedge shape directed towards the ring axis. Additionally, the spring elements can be embodied with at least one concave midsection radially and/or axially directed towards the ring axis, wherein if a support plate is present, on both sides of the respective support plate the respective portion of the spring element is provided at the outside of the ring and at the inside of the ring with concave midsections axially directed towards the ring axis. The same thing can apply in the radial direction directed towards the ring axis, wherein the radially directed concave midsections are present on the spring element at the ring sides.

Further developments and specific embodiments of the invention are disclosed in the details of the additional dependent claims.

BRIEF DESCRIPTION OF THE DRAWINGS

The invention is described in greater detail in several drawings with the aid of exemplary embodiments.

Wherein:

FIG. 5 shows illustrations for the wedge packet ring divided into two one-piece ring segments, with an inner wedge part and with an outer wedge part at each end region of a ring segment, wherein

FIG. 8 shows illustrations, in longitudinal section, of wedge parts, wherein

FIG. 8a shows an inner wedge part modified from FIG. 5a and FIG. 5b, and

FIG. 8b shows an outer wedge part identical to the one in FIGS. 5a and 5b;

FIG. 10 shows multiple illustrations of components of a locking mechanism for joining together the one-piece ring segments of the wedge packet ring, wherein FIG. 10a shows the locking mechanism with the two closure part securing element halves and with the insertion elements engaged in the opposing notches of the closure part securing element halves and a sheet metal ring located between the two closure part securing element halves.

DETAILED DESCRIPTION

Figure 4:
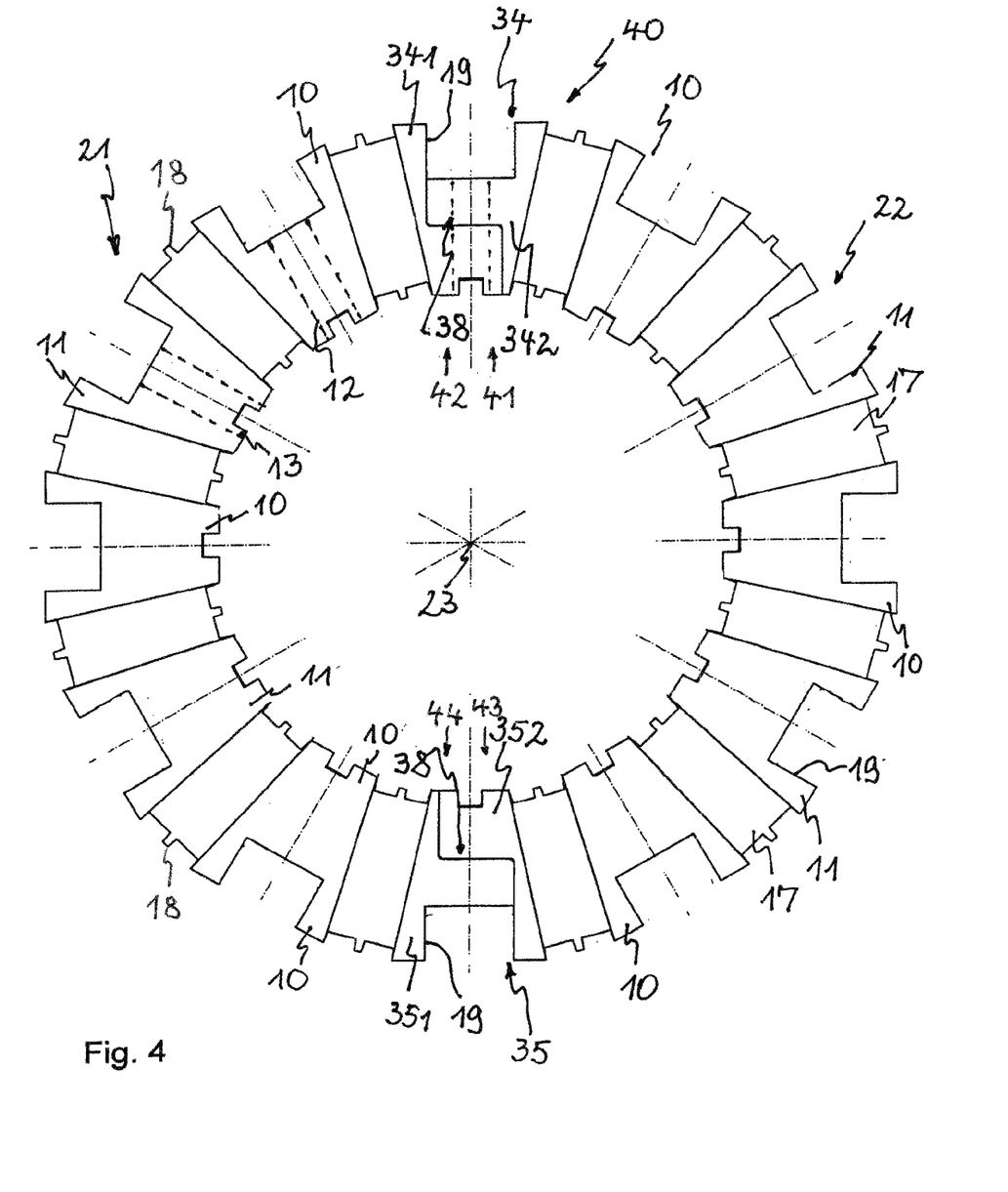
FIG. 4 shows a sectional illustration of the coupling ring according to the invention, joined together at the end regions of two one-piece ring segments and prestressed, in the form of a wedge packet ring.
Figures 5A, 5B:
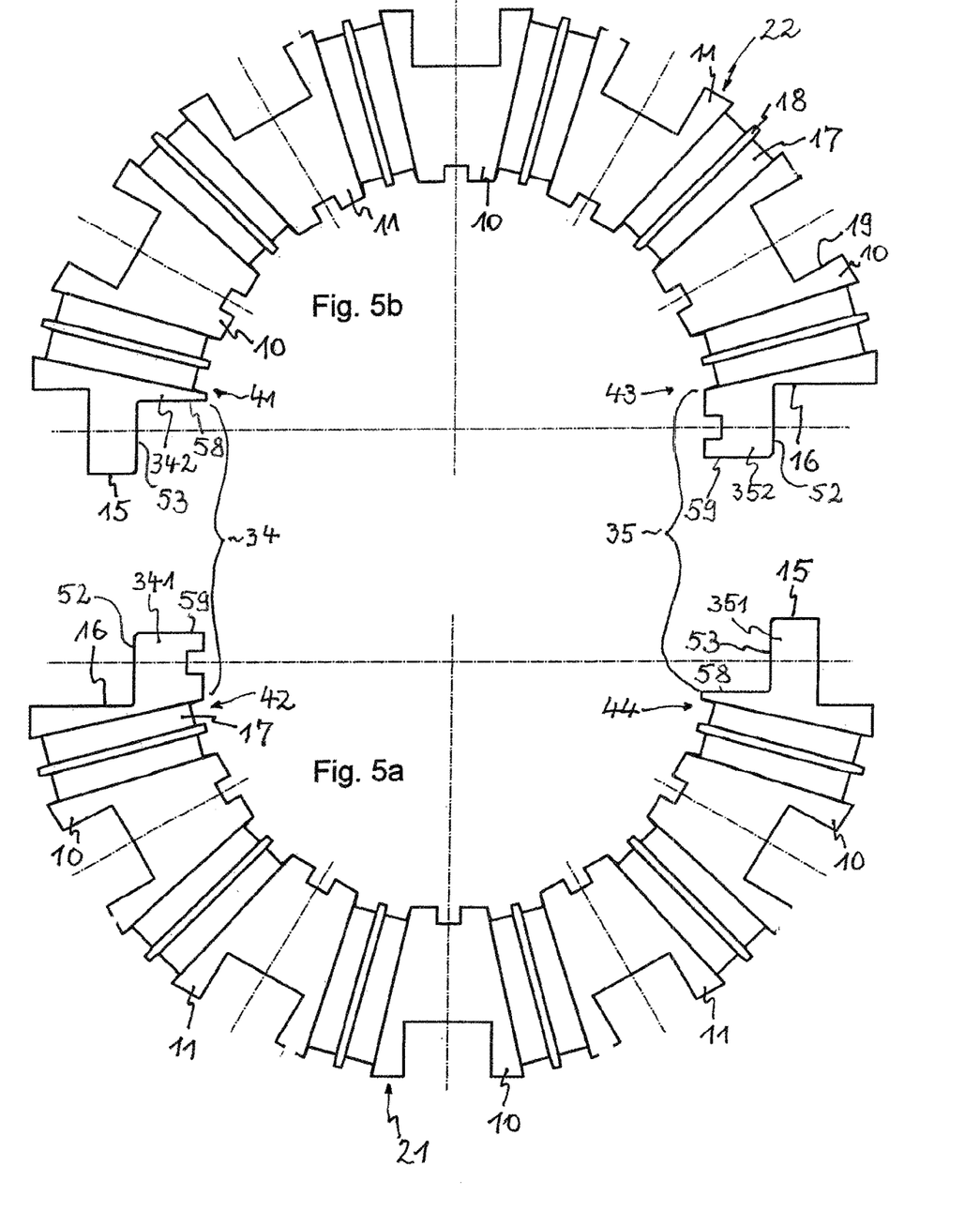
FIG. 5a shows a first ring segment having an outer ring part at the one end region and an inner wedge part at the other end region.
FIG. 5b shows a second ring segment having an inner wedge part at the one end region and an outer wedge part at the other end region, wherein respectively an inner wedge part of the one ring segment and an outer wedge part of the other ring segment oppose one another in an adapted embodiment.
Figure 6:
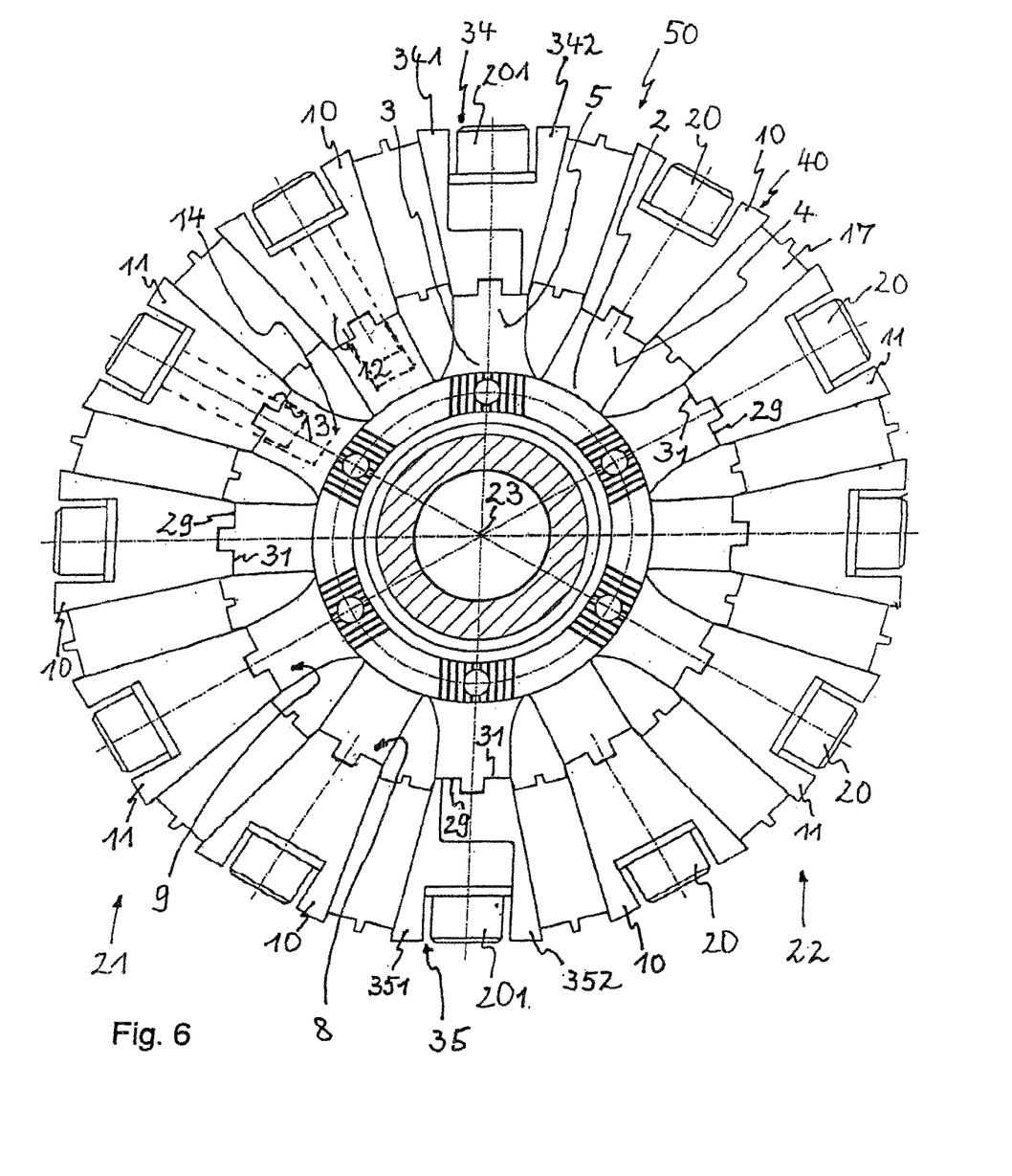
FIG. 6 shows an illustration in an axial view of a coupling having the ring-segmented wedge packet ring according to the invention, with solely radially directed screw connections at the star arm face regions of the two stars of the related coupling parts of the coupling.

Below, FIG. 4 and FIG. 5, including FIG. 5a and FIG. 5b, and FIG. 6 are considered together, taking into account the reference numerals of the coupling 30 according to FIG. 3 from the prior art, In FIG. 4, a coupling ring 40 is embodied in a schematic illustration in the form of a wedge packet ring for a coupling 50 having the two coupling parts 8, 9, wherein the wedge packet ring 40 at least comprises multiple securing, elements 10, 11 that are directed towards the ring axis 23 of the wedge packet ring 40 and arranged around the ring circumference, of which elements each has a continues bore 12, 13 directed solely towards the ring axis 23, wherein the continuous bores 12, 13 are used, for at least one screw connection 20 that is solely radially directed and can be implemented from the outer ring region 37, to attach the securing elements 10, 11 onto the two adapted coupling parts 8, 9 illustrated in FIG. 6, in order to connect the two coupling parts 8, 9, wherein the securing elements 10, 11 each comprise at the inner ring region 36 an axially running profile 31 directed towards the ring axis 23, between the adjacent securing elements 10, 11 one elastic spring element 17 each is present which is attached in a vulcanized manner to the adjacent securing elements 10, 11 in a simultaneously conducted vulcanization process, as a result of which an alternating arrangement of the securing elements 10, 11 and the elastic spring elements 17 constitutes a wedge packet ring 40, which can be screwed radially onto the two adapted coupling parts 8, 9 in order to connect the two coupling parts 8, 9, According to the invention, as is shown in FIG. 5, the wedge packet ring 40 is divided into at least two one-piece ring segments 21, 22 composed of an alternating arrangement of the securing elements 10, 11 and spring elements 17, wherein the one-piece ring segments 21, 22 are fitted with apportioned closure securing elements 34, 35 which are respectively located at the end regions on a ring segment 21, 22 and are provided to form a contacting closure 38, wherein the closure securing elements 34, 35 connecting the ring segments 21, 22 respectively comprise wedge parts 341, 342 and 351, 352 that are adapted to one another and have bores 12, 13 directed radially towards the ring axis 23, wherein the engaged wedge parts 341, 342 and 351, 352 can each be joined together to form the closure securing elements 34, 35 via a radially directed screw connection 201 on the two coupling parts 8, 9, While the securing elements 10, 11 are one-piece elements, there results from the division or segmentation of the wedge packet ring 40 composed in place of the original securing elements 10, 11 at the respective end region 41, 42 and 43, 44 of the ring segments 21, 22 the apportioned closure securing elements 34, 35 according to FIG. 5, FIG. 5a, and FIG. 5b.

The closure 38 shown in FIG. 4 at the respective end regions 41-42, 43-44 of the ring segments 21, 22 comes into existence when the predefined contact surfaces 15, 58 of the outer wedge part 342 or 351 are in firm contact according to FIG. 4 in a positive fit with the contact surfaces 16, 59, which correspond to the contact surfaces 15, 58, of the inner wedge part 341, 352 according to FIG. 5a, 5b.

FIG. 4 thereby shows a sectional illustration of the coupling ring 40 according to the invention, which ring can be joined together at the end regions 41, 42 and 43, 44 of the ring segments 21, 22, said end regions being indicated in FIG. 5 or FIG. 5a and FIG. 5b, and can be prestressed. The wedge packet ring 40 is illustrated as being completely divided, or completely separable, into the two one-piece ring segments 21, 22 thereof in FIGS. 5, 5a, 5b. Alternatively, identical wedge parts can be present at the end regions of the ring segments.

The illustrations in FIG. 5 for the wedge packet ring 40 divided into two ring segments 21, 22 are provided with an inner wedge part 341, 352 and with an outer wedge part 342, 351 at respectively one end region 41, 42; 43, 44 of the respectively related ring segment 21; 22, wherein FIG. 5a shows a first ring segment 21 having at the one end region 44 thereof an in longitudinal section pick-hammer-like wedge part 351 and at the other end region 42 thereof an in longitudinal section chair-like outer wedge part 341, and FIG. 5b shows a second ring segment 22 having at the one end region 41 thereof an in longitudinal section pick-hammer-like outer wedge part 342 and at the other end region 43 thereof an in longitudinal section chair-like inner wedge part 352, wherein respectively the in longitudinal section chair-like inner wedge part 341; 352 of the one ring segment 21; 22 and the in longitudinal section pick-hammer-like outer wedge section 342; 351 of the other ring segment 22; 21 respectively oppose one another for a closure 38. The contacting contact surfaces 15, 16 and 58, 59 create a positive fit; the contacting contact surfaces 52, 53 create a frictional fit, Since in the contact regions positive fits occur depending on the radially directed surfaces 15, 16 and 58, 59 and frictional fits occur depending on the tangentially directed surfaces 52, 53, these apportioned securing elements are referred to as closure securing elements or closure part securing elements.

FIG. 6 shows an illustration in an axial view of a coupling 50 having the wedge packet ring 40 according to the invention with solely radially directed screw connections 20, 201 at the star arm face regions 4, 5 of the two stars 2, 3 of the related coupling parts 8, 9 of the coupling 50.

In the illustrated coupling 50 with the joined-together segmented wedge packet ring 40 on the two coupling parts 8, 9—one drive-side coupling part 8 and one output-side coupling part 9—the coupling parts 8, 9 each comprise a star 2, 3 with star arms and star arm face regions 4, 5 located thereon, wherein the two stars 2, 3 are arranged in the coupling 50 such that they oppose one another and are axially angularly offset from one another, and the star arm face regions 4, 5 axially offset from the respective star center are each provided with at least one threaded bore 14 for radial screw connections 20, 201 of the wedge packet ring 40.

The closed ring-segmented wedge packet ring 40 comprises multiple metallic securing elements 10, 11, 34, 35 that are directed towards the axis 23 of the wedge packet ring 40, arranged around the ring segment circumference, and formed in a wedge shape, of which elements each has at least one continuous bore 12, 13 directed solely radially towards the ring axis 23, wherein the continuous bores 12, 13 are present, for at least one solely radially directed screw connection 20, 201, to attach the securing elements 10, 11, 34, 35 on the threaded bores 14, which are directed radially towards the ring axis 23, of the star arm face regions 4, 5 located on alternating stars according to FIG. 6, wherein the wedge-shaped securing elements 10, 11, 34, 35 each comprise a surface 31 directed towards the ring axis 23, which surface respectively corresponds to a surface 29 of the star arm face regions 4, 5 when assembled, between the securing elements 10, 11, 34, 35 arranged adjacently around the ring segment circumference, one elastic spring element 17 each is present according to FIG. 6, which spring element is attached in a vulcanized manner to the respectively adjacent securing elements 10, 11, 34, 35 of a ring segment 21, 22 in a vulcanization process, wherein the alternating arrangement of the wedge-shaped securing elements 10, 11, 34, 35 and the elastic spring elements 17 forms at least two wedge packet ring segments 21, 22 produced in a vulcanization process, which segments can be screwed as individual ring segments onto the two star arm face regions 4, 5 axially offset on alternating stars, so that, once assembled, the wedge packet ring 40 constitutes an elastically formed ring and permits a uniform tangential generation of prestress, wherein the tangential generation of prestress relates to the two stars 2, 3 of the two coupling parts 8, 9, which stars oppose one another in an angular offset from one another.

By means of the radially directed screw connections 20, the securing elements 10 and 11 can be screwed onto the star arm face regions 4, 5 of the stars 2, 3 of the coupling parts 8 or 9. By means of the radially directed screw connections 201, the apportioned closure securing elements 34, 35 can be screwed under prestress onto the star arm face regions 4, 5 of the stars 2, 3 of the coupling parts 8, 9.

Figure 7:
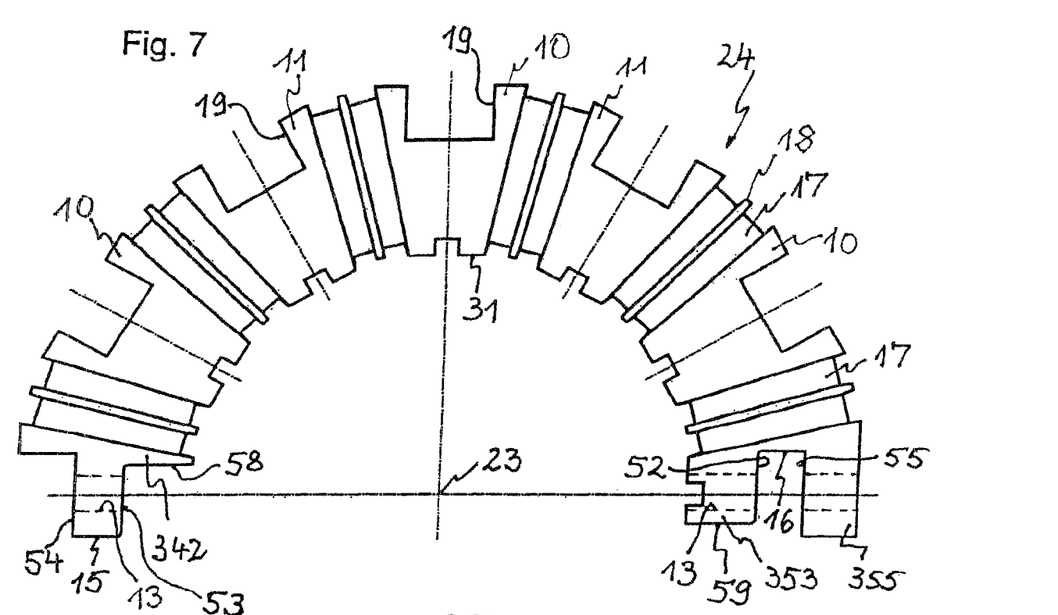
FIG. 7 shows a schematic illustration of a ring segment of a wedge packet ring according to the invention, with a different embodiment of the inner wedge part and outer wedge part than in FIG. 5a and FIG. 5b.

In FIG. 7, a schematic illustration of a further ring segment 24 of a wedge packet ring 40 according to the invention is shown with a modified embodiment of the in longitudinal section chair-like inner wedge part 353, without a depression 19 and instead with a head closure part 355, and of the in longitudinal section pick-hammer-like outer wedge part 342 from FIG. 5a and FIG. 5b.

When two ring segments 24, 24 (not shown) are joined together, the two wedge parts 353 and 342 come into contact at the contact surfaces 15 and 16, and 38 and 59 to respectively form a closure securing element 34, 35. The closure securing elements 34, 35 which thereby result comprise no depression 19 and are securely screwed onto the provided coupling part 8 or 9 using the screws of the screw connection 201 that protrude past the wedge packet ring 40. Alternatively, identical wedge parts can be present at the end regions of the ring segments 24.

Figure 8:
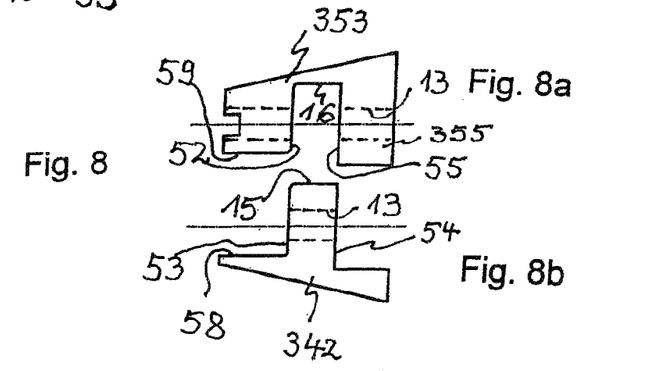

FIG. 8 shows illustrations of the two matching wedge parts 353 and 342 according to FIG. 7, wherein FIG. 8a shows the inner wedge part 353 modified from FIG. 5a and FIG. 5b with a head closure part 355, and FIG. 8b shows an in longitudinal section pick-hammer-like outer wedge part 342 identical to FIG. 5a and FIG. 5b.

The inner longitudinal section aforementioned chair-like inner wedge part 352 is thereby modified with an attached head closure part 355, and when the closure 38 is formed the head closure part 355 also bears against the in longitudinal section pick-hammer-like outer wedge part 342.

The inner wedge parts 353 and the outer wedge parts 342 can comprise the bore 13 or 12.

The contacting contact surfaces 15 and 16, and 58 and 59 create a positive fit; the contacting contact surfaces 52, 53 and 54, 55 respectively create a frictional fit.

Figure 9:
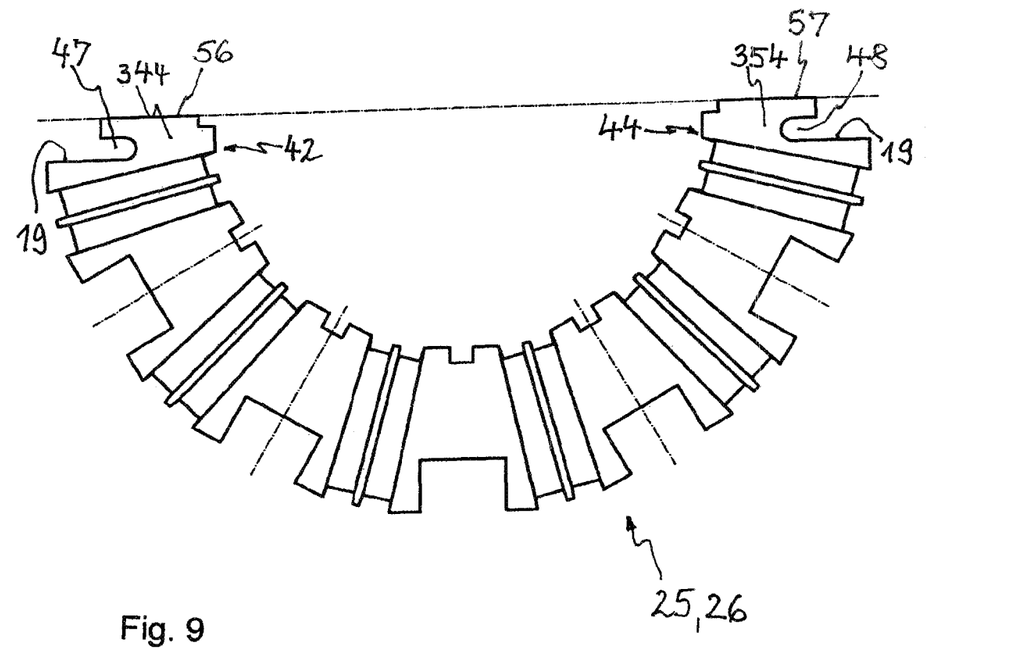
FIG. 9 shows an illustration of a ring segment with half closure part securing elements on the end sides of the ring segment, wherein a closure securing element is apportioned into two closure part securing element halves.

FIG. 9 shows an illustration of a further ring segment 25 or 26 with halved closure part securing elements 344, 355 at the end regions 42, 44 of the ring segment 25.

Figure 11:
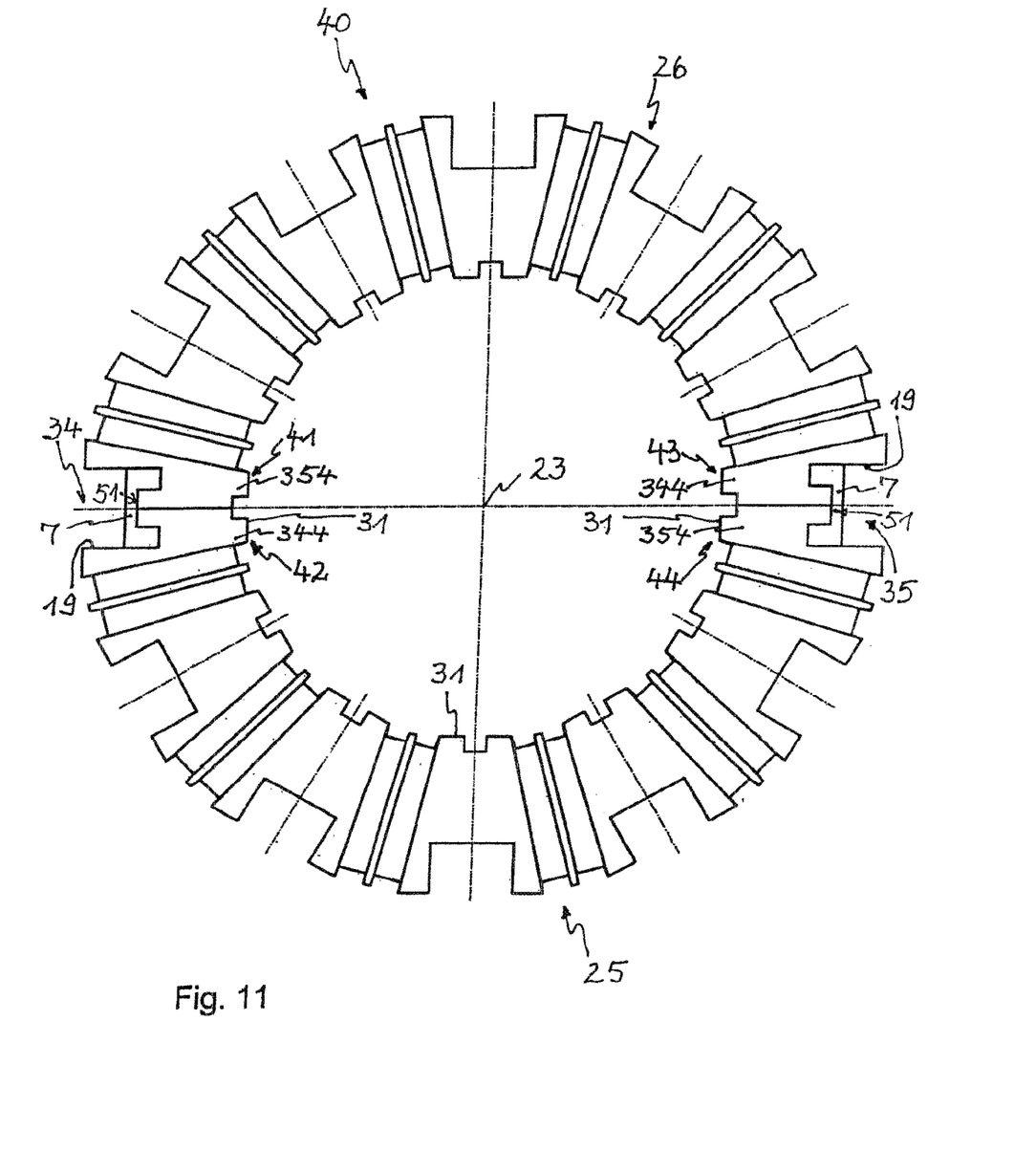
FIG. 11 shows a schematic illustration of the wedge packet ring according to the invention, without coupling parts and with the two closure part securing elements comprising locking mechanisms.

The one-piece ring segment 25; 26 with halved closure part securing elements 344, 354 according to FIG. 9 is at the end regions 42, 44 of the ring segment 25; 26 embodied with at least one notch 47 in the halved closure part securing element 344 and is embodied with at least one notch 48 in the other halved closure part securing element 354, wherein the two one-piece ring segments 25; 26 can be joined together to form a wedge packet ring 40 according to FIG. 11 when the halved closure part securing elements 344, 354 that correspond to one another are in contact in an opposing manner and each form a closure securing element 34, 35, and wherein in the notches (47, 48) spaced apart from one another, clip-like or bridge-like insertion elements (7) are integrated to retain the closure securing elements (34, 35).

Figures 10, 10A:
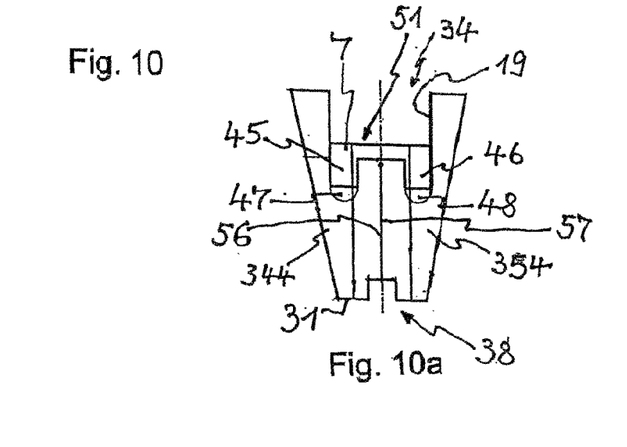
Figure 10B:
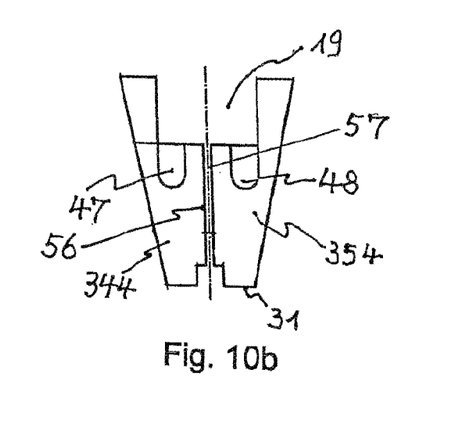
FIG. 10b shows the two closure part securing element halves with the opposing notches and an annular gap between the closure part securing element halves.
Figure 10C:
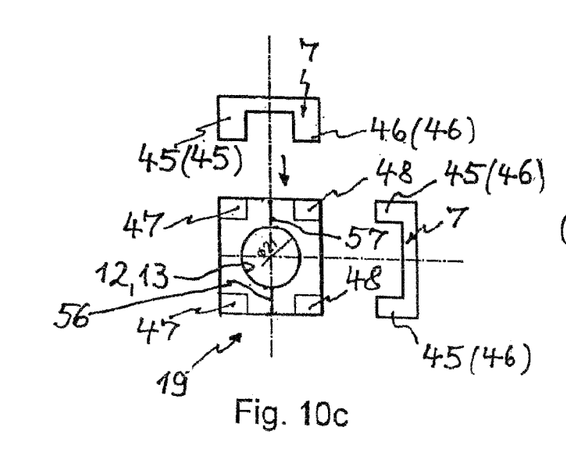
FIG. 10c shows a top view of the depression of the two closure part securing element halves which are in contact with one another.

FIG. 10 shows illustrations according to FIG. 9 of components of a closure securing element 34, which is embodied with a locking mechanism 51, for the purpose of joining together the end regions of the ring segments 25, 26 of a wedge packet ring 40, wherein FIG. 10a shows a locking mechanism 51 in the two closure part securing elements halves 344, 354, said locking mechanism being composed of radially directed notches 47, 48 in the closure part securing element halves 344, 354 and of an insertion element 7 which can be inserted into the notches 47, 48, FIG. 10b shows the two proximately located closure part securing element halves 344, 354 with the opposing notches 47, 48 spaced apart from one another, and FIG. 10c shows a top view of the depression 19 of the two joined-together closure part securing element halves 344, 354 in contact with one another at the contact surfaces 56, 57, said securing element halves having the notches 47, 48 that are integrated at the corners and spaced apart from one another, and with the free insertion element 7.

The insertion elements 7 can be embodied as a clip with parallel-aligned tabs 45, 46 at the ends and are integrated, or inserted or plugged, with the tabs 45, 46 thereof at the ends into the notches 47 and 48 adapted to the tabs 45, 46 to fix and lock the two closure part securing element halves 344 and 345 via the depression 19. The friction-fitting connection then occurs with the screw connection 201.

In FIG. 10c, the embodiment of the notches 47, 48 is adapted to the tabs 45, 46 that are to be plugged in.

The same thing applies to the other closure securing element 35.

In FIG. 11, a schematic illustration of the wedge packet ring 40 according to the invention is shown without coupling parts 8, 9 but with the two locking mechanisms 51 of the closure securing elements 34, 35.

The advantage of the wedge packet ring 40 shown in FIG. 11 is that the two one-piece ring segments 25, 26 are embodied identically and, with the two locking mechanisms 51 for the two closure securing elements 34, 35, thus enable a simple and quick assembly of the wedge packet ring 40.

Figure 12:
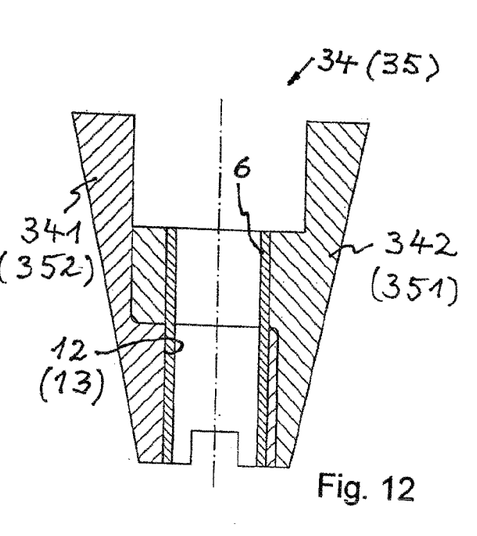
FIG. 12 shows a schematic illustration of an apportioned securing element with a sleeve in the interior.

In FIG. 12, a schematic illustration of an apportioned securing element 34 is shown with a sleeve 6 in the interior, in particular in the bore 12 or 13, of the securing element 34. The screw connection 201 (not shown) can be integrated into the sleeve 6. The sleeve 6 can serve as a retaining sleeve for the two wedge parts 341, 342 of the apportioned securing element 34. A shoulder screw (not shown) can also be used for the screw connection 201. The same thing applies, for example, to the apportioned securing element 35 with the wedge parts 352, 351 and with the sleeve 6 or only with the shoulder screw (not shown).

Below, the coupling ring 40 according to the invention is described in the form of the wedge packet ring for the coupling 50 with the coupling 30 specified in the prior art, in combination with the two coupling parts 8, 9.

The star arm face regions 4, 5 respectively belonging to a star 2, 3 and adapted to the securing elements 10, 11, 34, 35 of the wedge packet ring 40 each constitute end regions of the star arms 27, 28 extending out from a central region of the star 2, 3, wherein the end regions comprise a surface 29 directed towards the securing elements 10, 11, with which surface a contacting connection to the surface 31 on the wedge-shaped narrow end region 32 of the wedge-shaped securing element 10, 11, 34, 35 can be produced.

The star arm face regions 4, 5 of the stars 2, 3 can each comprise an axially directed surface 29 with a profile, Which surface is positioned before the screw connection 20, 201 below the surface 31 with a profile on the wedge-shaped narrow edge region 32 of the respectively matched securing element 10, 11, 34, 35, wherein both surfaces 29, 31 are in contact with one another when assembled.

The profiles of the surfaces 31 of the securing elements 10, 11, 34, 35 and the profiles of the surfaces 29 of the star arm face regions 4, 5 can be corresponding embodiments which have a positive fit with one another.

By means of the screw connections 20, 201, a frictional fit is generally achieved between the wedge packet ring 40 and the coupling parts 8, 9, which frictional fit is supported by the positive fits (spring, groove). In general, there is a hybrid of a frictional fit and positive fit in the region of the connection between the wedge packet ring 40 and the two coupling parts 8, 9 assigned to the coupling 50. The securing elements comprising at least one of the fits are referred to as closure securing elements or closure part securing elements.

All metal securing elements 10, 11, 34, 35 can preferably comprise at the wedge-shaped wide end region 33 outer recesses/slots/depressions 19, each in the form of a countersunk groove or a countersunk hole, for the radially directed screw connections 20, 201.

The spring elements 17 can be composed entirely of rubber. However, the spring elements 17 can also comprise at least one flat support plate 18 directed towards the ring axis 23.

The shapes of the securing elements 10, 11, 34, 35 are adapted to the shapes of the spring element 17 such that the vulcanization of the spring elements 17 to the securing elements 10, 11, 34, 35 can take place with the same quality for the one-piece ring segments 21, 22, 25, 26.

By means of the screw connections 20, 201, the securing element 10 can be connected in an alternating manner, starting from a securing element 10 of the wedge packet ring 40, to the star arm face region 4 of the one star 2, and then the securing element 11 adjacent to the securing element 10 can be connected to the star arm face region 5 of the other star 3, which face region is adjacent to the star arm face region 4 of the one star 2, wherein subsequently a further securing element 10 is again connected to a further star arm face region 4 of the one star 2, and so on, so that the wedge packet ring 40 is radially screwed onto the intermeshed coupling parts 8, 9 at the inner ring region 36.

The advantages of the elastic, segmented wedge packet ring 40 according to the invention with a tangential creation of prestress on the two coupling parts 8, 9 in the coupling 50 is a uniform displacement compensation created by the simultaneous vulcanization of all spring elements 17 onto the adjacent securing elements 10, 11, 34, 25 of the respective ring segments 25, 26, and in particular an elimination of an assembly apparatus for the uniform creation of prestress on the stars 2, 3 of the coupling parts 8, 9.

The essence of the invention enables an attachment of a ring-segmented, two-piece or more wedge packet ring 40 composed of at least the two, each individually vulcanized ring segments 25, 26 by means of the solely radial screw connection 20, 201 onto the star arm face regions 4, 5 of the coupling stars 2, 3, which face regions are located below the securing elements 10, 11, 34, 35, embodied with radially directed threaded bores 14, and axially offset from the star centers. Additionally, the pronounced corresponding profiles 29, 31 support the fixing of the wedge packet ring 40 at the star arm face regions 4, 5 of the coupling parts 8, 9.

Apart from this, the securing elements 10, 11, 34, 35 can be composed of solid material, in particular, can be embodied metallically or from another solid substance/matter/material.

By means of the screwing-on of the wedge packet ring 40 onto the end regions of the coupling parts 8, 9, a radial prestress is created in the related coupling 50, both in the undivided securing elements and also in the apportioned closure securing elements.

LIST OF REFERENCE NUMERALS

1 Coupling ring as wedge packet ring according to the prior art/wedge packet ring
2 First star
3 Second star
4 First star arm face region
5 Second star arm face region
6 Sleeve
7 insertion element
8 First coupling part
9 Second coupling part
10 First securing element
11 Second securing element
12 First bore
13 Second bore
14 Threaded bore
15 Contact surface
16 Contact surface
17 Spring element
18 Radially directed support plate
19 Countersunk groove/countersunk hole/depression
20 Radially directed screw connection
201 Screw connection for apportioned closure securing elements
21 First ring segment
22 Second ring segment
23 Ring axis of the wedge packet ring
24 Ring segment
25 Ring segment
26 Ring segment
27 Star arm of the one star
28 Star arm of the other star
29 Surface of the star arm face region/profile
30 Coupling with coupling ring according to the prior art
31 Surface of the securing element/profile
32 Wedge-shaped narrow end region
33 Wedge-shaped wide end region
34 First closure securing element
341 In longitudinal section chair-like inner wedge part
342 In longitudinal section pick-hammer-like outer wedge part
344 Halved closure part securing element
35 Second closure securing element
351 In longitudinal section pick-hammer-like outer wedge part
352 In longitudinal section chair-like inner wedge part
353 Inner wedge part with head closure part
354 Halved closure part securing element
355 Head closure part
36 Inner ring region
37 Outer ring region
38 Closure/positive fit/frictional fit
40 Coupling ring according to the invention
41 End region
42 End region
43 End region
44 End region
45 First tab
46 Second tab
47 First notch
48 Second notch
50 Coupling with coupling ring/wedge packet ring according to the invention
51 Locking mechanism
52 Contact surface
53 Contact surface
54 Contact surface
55 Contact surface
56 Contact surface
57 Contact surface
58 Contact surface
59 Contact surface

The invention claimed is:

1. A coupling ring for couplings having at least two coupling parts, the coupling ring being embodied as a wedge packet ring comprising:
a plurality of securing elements being arranged around a circumference of the wedge packet ring, each of the securing elements extending toward an axis of the wedge packet ring;
each of the securing elements having at least one continuous bore extending solely radially toward the ring axis, each continuous bore being configured to receive a respective screw connector configured to extend solely radially and configured to be implemented from an outer ring region to attach the securing elements on two adapted coupling parts to connect the two coupling parts;
each of the securing elements having an axially extending profile at an inner ring region and extending toward the ring axis;
a respective elastic spring element being positioned between adjacent pairs of securing elements and being attached to the adjacent pairs by vulcanization, whereby the attachment of successive ones of the adjacent pairs of securing elements and elastic spring elements constitutes the wedge packet ring, which can be screwed radially onto the two coupling parts in order to connect the two coupling parts;
the wedge packet ring being divided into at least two completely separable one-piece ring segments from an attached arrangement of the successive ones of the adjacent pairs of securing elements and elastic spring elements;

the at least two completely separable one-piece ring segments being fitted with closure securing elements that are respectively located at opposite end regions of the at least two completely separable one-piece ring segments, thereby forming contacting closures at the end regions provided by the closure securing elements connecting together the at least two completely separable one-piece ring segments, each comprising respective wedge parts that are adapted to one another and which have bores directed radially towards the ring axis, the wedge parts constituting the contacting closures joining together on respective ones of the two coupling parts via respective radially directed screw connectors.

2. The coupling ring according to claim 1, wherein:
the closure securing elements are elements resulting from a division or segmentation of the wedge packet ring in place of an initial undivided securing elements at the respective end regions of the one-piece ring segments, and which are joined together by means of a closure as a positive fit and or as a frictional fit.

3. The coupling ring according to claim 1, wherein:
the contacting closure is configured to occur at each of the respective end regions of the ring segments when a defined contact surface of the outer wedge part is in firm closure with a contact surface of the inner wedge part, which contact surface corresponds to the contact surface.

4. The coupling ring according to claim 1, wherein:
the wedge packet ring is configured to be separated into two of the at least two one-piece ring segments with an inner wedge part and with an outer edge part on one end region of a respective ring segment;
a first of the one-piece ring segments can be embodied with an outer wedge part on one end region thereof and an inner wedge part on the other end region thereof, and a second ring segment can be embodied with an outer wedge part on one end region thereof and an inner wedge part on the other end region thereof;
the inner wedge parts of the first ring segment and the outer wedge parts of the second ring segment each oppose one another before the wedge packet ring is closed and are in contact in a manner for a closure when the wedge packet ring is closed.

5. The coupling ring according to claim 4, wherein:
a closure securing element has a pick-hammer shape in longitudinal section outer wedge part, and a chair shape in longitudinal section inner wedge part, with both parts adapted to one another, each of the parts being in direct contact with a contact surface thereof on the longitudinal section pick-hammer-shaped outer wedge parts and with the contact surface thereof on the longitudinal section chair-shaped inner wedge parts when the closure is formed during the closing of the wedge packet ring.

6. The coupling ring according to claim 5, wherein:
the longitudinal section chair-shaped inner wedge part is modified by means of an attached head closure part, and the head closure part also bears against the in longitudinal section pick-hammer-like outer wedge part when closure occurs.

7. The coupling ring according to claim 1, wherein:
each of the coupling parts includes a star having star arms and star arm face regions located thereon;
the two stars are arranged in the coupling such that they oppose one another and are axially angularly offset from one another, and the star arm face regions are axially offset from respective star centers and are each provided with at least one threaded bore for screw connectors of the wedge packet ring;
the securing elements are configured to be screwed onto the star arm face regions of the stars of the coupling parts by means of the radially directed screw connectors; and
the closure securing elements are configured to be screwed under radial prestress onto the star arm face regions of the stars of the coupling parts by means of the radially directed screw connections.

8. The coupling ring according to claim 1, wherein:
a one-piece ring segment with halved closure part securing elements are at the end regions of the ring segment embodied with at least one notch in the halved closure part securing element and with at least one notch in the other halved closure part securing element;
the two one-piece ring segments are configured to be joined together to form a ring when halved closure part securing elements that correspond to one another are in contact in an opposing manner and each forming a closure securing element; and
the notches are spaced apart from one another and clip shaped or bridged-shaped insertion elements are integrated to retain the closure securing elements.

9. The coupling ring according to claim 8, wherein:
the insertion elements embodied as clips or bridges have identically parallel-directed tabs at ends, and with the tabs thereof at the ends are integrated into the notches that are adapted to the tabs and spaced apart from one another, to fix and lock the two closure part securing element halves for the formation of the closure securing elements.

10. The coupling ring according to claim 1, wherein:
all securing elements are composed of solid material.

11. The coupling ring according to claim 1, wherein:
all securing elements are composed of metallic material.

12. The coupling ring according to claim 1, wherein:
the shapes of the securing elements are adapted to shapes of the elastic spring element so that the vulcanization of the spring elements to the securing elements can take place while maintaining constant usage properties of the one-piece ring segments.

13. The coupling ring according to claim 1, wherein:
the securing elements are formed with a wedge shape extending toward the ring axis; and
the wedge-shaped has a narrow end region at the inner ring region and a wide end region at the outer ring region.

14. The coupling ring according to claim 13, wherein:
at the wedge-shaped wide end region, the securing elements thereof comprises outer recesses/slots/depressions, each in the form of either a countersunk groove or a countersunk hole, for the radially directed screw connectors.

15. The coupling ring according to claim 1, wherein:
the elastic spring elements comprise at least one support plate extending toward the ring axis.

16. The coupling ring according to claim 1, wherein:
the bore of a closure securing element is provided with a sleeve through which the screw connector is guided to a respective coupling part and which serves as a retaining sleeve for a respective wedge part of a respective securing element.

* * * * *